United States Patent
Zhang

(10) Patent No.: US 12,505,605 B2
(45) Date of Patent: Dec. 23, 2025

(54) SOLVING LOW EFFICIENCY OF MOVING ADJUSTMENT CAUSED BY CONTROLLING MOVEMENT OF IMAGE USING MODEL PARAMETERS

(71) Applicant: Beijing Bytedance Network Technology Co., Ltd., Beijing (CN)

(72) Inventor: Jiayi Zhang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 411 days.

(21) Appl. No.: 18/011,120

(22) PCT Filed: May 28, 2021

(86) PCT No.: PCT/CN2021/096946
§ 371 (c)(1),
(2) Date: Dec. 16, 2022

(87) PCT Pub. No.: WO2021/254127
PCT Pub. Date: Dec. 23, 2021

(65) Prior Publication Data
US 2023/0252715 A1    Aug. 10, 2023

(30) Foreign Application Priority Data
Jun. 19, 2020 (CN) ................... 202010566418.4

(51) Int. Cl.
*G06T 15/04* (2011.01)
*G06T 15/00* (2011.01)
*G06T 19/00* (2011.01)

(52) U.S. Cl.
CPC ............ *G06T 15/04* (2013.01); *G06T 15/005* (2013.01); *G06T 19/00* (2013.01)

(58) Field of Classification Search
None
See application file for complete search history.

(56) References Cited

U.S. PATENT DOCUMENTS

| | | | |
|---|---|---|---|
| 10,529,137 B1 * | 1/2020 | Black | G06T 15/04 |
| 2007/0110298 A1 * | 5/2007 | Graepel | G06V 40/28 345/619 |

(Continued)

FOREIGN PATENT DOCUMENTS

| | | |
|---|---|---|
| CN | 1985290 A | 6/2007 |
| CN | 105138979 A | 12/2015 |

(Continued)

OTHER PUBLICATIONS

ISA China National Intellectual Property Administration, International Search Report Issued in International Application No. PCT/CN2021096946, Aug. 19, 2021, 13 pages.

(Continued)

*Primary Examiner* — Kent W Chang
*Assistant Examiner* — Jonathan M Cofino
(74) *Attorney, Agent, or Firm* — Alleman Hall & Tuttle LLP

(57) ABSTRACT

A method includes: acquiring first position data of a first vertex in a stereo model; determining, from a first texture pattern matched with a pattern represented by the stereo model, a second vertex corresponding to the first position data; where the first texture pattern is a grayscale image, and each second vertex in the first texture pattern corresponds to a grayscale value; and taking a grayscale value corresponding to the second vertex as a movement offset of the first vertex in the stereo model to control movements of at least some first vertexes in the stereo model by using movement offsets of at least some first vertexes.

14 Claims, 2 Drawing Sheets

(56) References Cited

U.S. PATENT DOCUMENTS

| | | | |
|---|---|---|---|
| 2008/0062206 A1 | 3/2008 | Lyapunov et al. | |
| 2010/0111370 A1* | 5/2010 | Black | G06F 18/2321 |
| | | | 705/26.1 |
| 2020/0298117 A1* | 9/2020 | Yonezu | G06T 19/20 |

FOREIGN PATENT DOCUMENTS

| | | | |
|---|---|---|---|
| CN | 105787994 A | 7/2016 | |
| CN | 107145224 A | 9/2017 | |
| CN | 108961369 A | 12/2018 | |
| CN | 109887081 A | 6/2019 | |
| CN | 109961498 A | 7/2019 | |
| CN | 110033519 A | 7/2019 | |
| CN | 110838162 A | 2/2020 | |
| CN | 111054072 A | 4/2020 | |
| CN | 111462205 A | 7/2020 | |
| CN | 111667563 A | 9/2020 | |
| EP | 3506161 A1 | 7/2019 | |
| JP | 2000172879 A | 6/2000 | |

OTHER PUBLICATIONS

Zhiguo L., et al., "Fully Automatic Face Animation with Arbitrary Topology Structure based on MPEG-4," Journal of Computer-Aided Design and Computer Graphics, Jul. 2003, No. 7, 7 pages. Submitted with English Abstract as Explanation of Relevance.

* cited by examiner

SOLVING LOW EFFICIENCY OF MOVING ADJUSTMENT CAUSED BY CONTROLLING MOVEMENT OF IMAGE USING MODEL PARAMETERS

CROSS-REFERENCE TO RELATED APPLICATIONS

This application is a National Stage of International Application PCT/CN2021/096946, filed on May 28, 2021, which claims priority to Chinese Patent Application No. 202010566418.4, filed on Jun. 19, 2020, entitled "IMAGE PROCESSING METHOD, APPARATUS AND DEVICE AND STORAGE MEDIUM", both of which are hereby incorporated by reference herein.

TECHNICAL FIELD

The present application relates to the field of image processing and, in particular, to an image processing method, apparatus and device and a storage medium.

BACKGROUND

With regard to a 3D (three-dimensional) scene, the movement of a 3D model is usually controlled by means of model parameters. For example, displacement parameters are taken as the model parameters, and the movement of the 3D model is controlled by setting parameter values of the displacement parameters. However, the amount of data processing for this manner is relatively large, and particularly when a movement effect needs to be adjusted, the parameter values of the displacement parameters need to be reset, and then the 3D model is restarted, which reduces adjustment efficiency.

SUMMARY

In order to solve the above problem, the present application provides an image processing method, apparatus and device, and a storage medium, which solve the problem in the prior art of low efficiency in movement adjustment caused by controlling the movement of an image by means of model parameters.

In a first aspect, an embodiment of the present application provides an image processing method, including:
 acquiring first position data of a first vertex in a stereo model;
 determining, from a first texture pattern matched with a pattern represented by the stereo model, a second vertex corresponding to the first position data; where the first texture pattern is a grayscale image, and each second vertex in the first texture pattern corresponds to a gray scale value; and
 taking a grayscale value corresponding to the second vertex as a movement offset of the first vertex in the stereo model to control movements of at least some first vertexes in the stereo model by using movement offsets of the at least some first vertexes.

In a specific example of the present application, the method further includes:
 selecting, from the stereo model, at least some first vertexes to be moved;
 setting, based on a movement effect, movement offsets of the at least some selected first vertexes, generating a grayscale image matched with the pattern represented by the stereo model, and at least making grayscale values of second vertexes, which correspond to the at least some first vertexes, in the grayscale image represent movement offsets of the at least some first vertexes; and
 taking the generated grayscale image as the first texture pattern matched with the pattern represented by the stereo model.

In a specific example of the present application, a movement effect is adjusted by adjusting the grayscale values of the second vertexes corresponding to the at least some first vertexes in the first texture pattern.

In a specific example of the present application, the grayscale value corresponding to the second vertex is taken as the movement offset of the first vertex in the stereo model by using a vertex shader to render movement effects of the at least some first vertexes in the stereo model.

In a specific example of the present application, before the acquiring the first position data of the first vertex in the stereo model, the method further includes:
 determining a third vertex corresponding to the first position data from a second texture pattern matched with the pattern represented by the stereo model; where the second texture pattern is a color image, and each third vertex in the second texture pattern corresponds to a color value; and
 taking a color value corresponding to the third vertex as a color value of the first vertex in the stereo model to obtain a color model.

In a second aspect, an embodiment of the present application provides an image processing apparatus, including:
 an acquiring unit, configured to acquire first position data of a first vertex in a stereo model;
 a determining unit, configured to determine, from a first texture pattern matched with a pattern represented by the stereo model, a second vertex corresponding to the first position data; where the first texture pattern is a grayscale image, and each second vertex in the first texture pattern corresponds to a grayscale value; and
 an image rendering unit, configured to take a grayscale value corresponding to the second vertex as a movement offset of the first vertex in the stereo model to control movements of at least some first vertexes in the stereo model by using movement offsets of the at least some first vertexes.

In a specific example of the present application, the apparatus further includes: an offset setting unit; where,
 the determining unit is further configured to select, from the stereo model, at least some first vertexes to be moved; and
 the offset setting unit is configured to set movement offsets of the at least some selected first vertexes based on a movement effect, generate a grayscale image matched with the pattern represented by the stereo model, and at least make grayscale values of second vertexes, which correspond to the at least some first vertexes, in the grayscale image represent movement offsets of the at least some first vertexes; and take the generated grayscale image as the first texture pattern matched with the pattern represented by the stereo model.

In a specific example of the present application, the determining unit is further configured to determine, from a second texture pattern matched with the pattern represented by the stereo model, a third vertex corresponding to the first position data; where the second texture pattern is a color image, and each third vertex in the second texture pattern corresponds to a color value; and the image rendering unit is further configured to take a color value corresponding to the third vertex as a color value of the first vertex in the stereo model to obtain a color model.

In a third aspect, an embodiment of the present application provides an image processing device, including:

one or more processors;

a memory communicatively coupled to the one or more processors; and one or more applications, where the one or more applications are stored in the memory and configured to be executed by the one or more processors, and the one or more applications are configured to perform the above method.

In a fourth aspect, an embodiment of the present application provides a computer readable storage medium having a computer program stored thereon, and when the program is executed by a processor, the above method is implemented.

In a fifth aspect, an embodiment of the present application provides a computer program product, including computer program instructions, and when the computer execution instructions are executed by a processor, the above method is implemented.

In a sixth aspect, an embodiment of the present application provides a computer program, and when the computer program is executed by a processor, the above method is implemented.

In this way, in the solution of the present application, a movement offset of a vertex in the stereo model is represented by a grayscale value of a vertex (i.e., a second vertex) in the first texture pattern matched with the pattern represented by the stereo model. That is to say, the offset of the vertex in the stereo model is recorded by the first texture pattern, and thus, it is unnecessary to control the movement of the stereo model through model parameters, which avoids the problem of low efficiency in movement adjustment caused by controlling the movement of an image by means of the model parameters, thereby improving the efficiency of image processing.

DESCRIPTION OF EMBODIMENTS

To make objectives, technical solutions, and advantages of the present application clearer and more comprehensible, the following further describes the present application in detail with reference to accompanying drawings and embodiments. It should be understood that, specific embodiments described herein are only used to explain the present application and are not intended to limit the present application.

In some flows described in the specification, claims, and drawings of the present application, a plurality of operations in a specific order are included, but it should be clearly understood that, the flows may include more or less operations, and the operations may be executed in order or in parallel.

Figure 1:
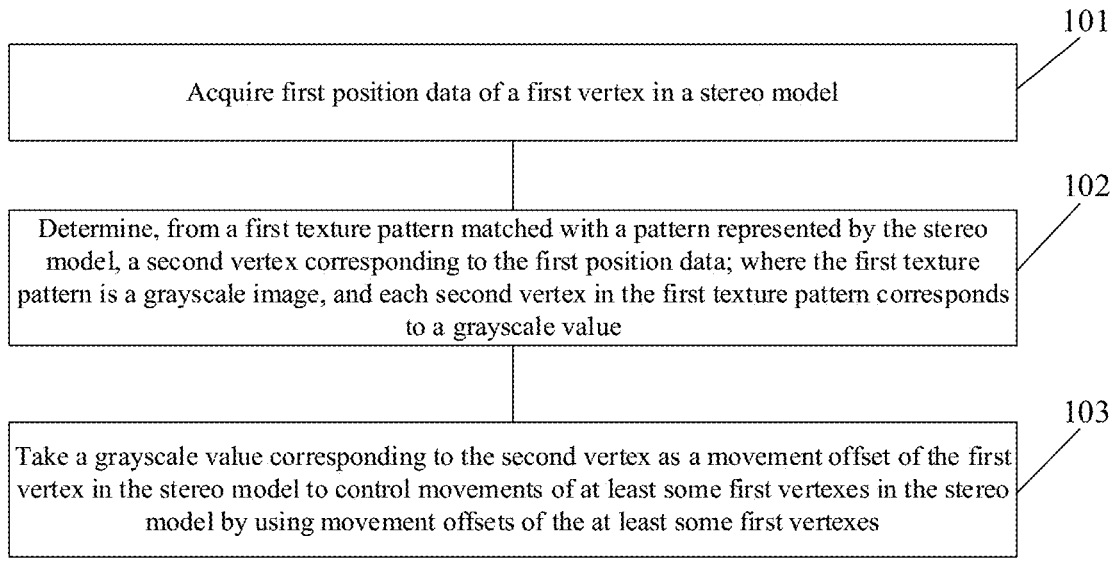
FIG. 1 is a schematic flowchart of implementing an image processing method according to an embodiment of the present application.

Embodiments of the present application provide an image processing method, apparatus and device, and a storage medium. Specifically, FIG. 1 is a schematic flowchart of implementing an image processing method according to an embodiment of the present application. As shown in FIG. 1, the method includes the following.

Step 101: acquire first position data of a first vertex in a stereo model.

In a practical application, the stereo model may specifically be a three-dimensional model, the first vertex is any point in the three-dimensional model, and the first vertex and the first position data are in one-to-one correspondence, that is, the first position data can uniquely indicate one vertex.

In a specific example, the stereo model is a rendered color model. Specifically, before the first position data of the first vertex in the stereo model is acquired, color rendering also needs to be performed on the stereo model. For example, a third vertex corresponding to the first position data is determined from a second texture pattern matched with the pattern represented by the stereo model; where the second texture pattern is a color image that matches (i.e., is consistent with) the pattern represented by the stereo model, and furthermore, each third vertex in the second texture pattern corresponds to a color value, such as an RGB (red, green and blue) value. Then, a color value corresponding to the third vertex is taken as a color value of the first vertex in the stereo model, and a color model is obtained after rendering. Here, the color rendering process described above may be implemented through a vertex shader.

Step 102: determine, from a first texture pattern matched with a pattern represented by the stereo model, a second vertex corresponding to the first position data; where the first texture pattern is a grayscale image, and each second vertex in the first texture pattern corresponds to a grayscale value.

Here, both the first texture pattern and the second texture pattern are patterns consistent with the pattern represented by the stereo model, but colors and functions of the two are different. For example, the first texture pattern is a grayscale image, and a grayscale value of each second vertex in the grayscale image indicates a movement offset of a corresponding vertex in the stereo model; while the second texture pattern is a color image, and a color value of each third vertex in the color image indicates a color value of a corresponding vertex in the stereo model.

Step 103: take a grayscale value corresponding to the second vertex as a movement offset of the first vertex in the stereo model to control movements of at least some first vertexes in the stereo model by using movement offsets of the at least some first vertexes.

Here, in a practical application, the vertex shader may be used to take the grayscale value corresponding to the second vertex as the movement offset of the first vertex in the stereo model, and render the movement effects of the at least some first vertexes in the stereo model.

In a specific example, the first texture pattern may be generated in the following manner. Specifically, at least some first vertexes to be moved are selected from the stereo model, that is, first vertexes to be moved are selected from all the first vertexes of the stereo model, and the first vertexes that need to be moved may be only a part of or all of the first vertexes. Then, movement offsets of the at least some selected first vertexes are set based on a movement effect, a grayscale image matched with the pattern represented by the stereo model (e.g., consistent with the pattern of the stereo model) is generated, and at least the grayscale values of the second vertexes, which correspond to the at least some first vertexes, in the grayscale image represent the movement offsets of the at least some first vertexes, that is, a grayscale value in the grayscale image is used to represent a movement offset. Further, the generated grayscale image is taken as the first texture pattern matched with the pattern represented by the stereo model. In this way, on the basis of ensuring that the movement effect is achieved, a basis is established for reducing the amount of data processing, and the process is simple and feasible, thereby facilitating subsequent large-scale engineering promotion.

Here, since the grayscale image, that is, the first texture pattern, is adopted to represent the movement offsets of the first vertexes in the stereo model, the movement effect of the first vertexes in the stereo model can be adjusted by adjusting the grayscale values of the second vertexes corresponding to the at least some first vertexes in the first texture pattern. In other words, the movement effect can be adjusted by adjusting the grayscale values in the grayscale image. Obviously, compared with the existing method of adjusting the movement effect through adjusting model parameters, it is unnecessary to restart the stereo model in the solution of the present application, which greatly reduces the amount of data processing, and improves the efficiency of data processing at the same time. Furthermore, the adjustment process can be seen in real time, thereby improving the visualization degree.

In this way, in the solution of the present application, a movement offset of a vertex in the stereo model is represented by a grayscale value of a vertex (i.e., a second vertex) in the first texture pattern matched with the pattern represented by the stereo model. That is to say, the offset of the vertex in the stereo model is recorded by the first texture pattern, and thus, it is unnecessary to control the movement of the stereo model through the model parameters, which avoids the problem of low efficiency in movement adjustment caused by controlling the movement of an image by means of the model parameters, thereby improving the efficiency of image processing.

Furthermore, since a grayscale value of a vertex in a grayscale image is used to record a movement offset, the adjustment of the movement effect becomes simple and convenient, the amount of data processing is small, and an effect of a rendered movement change can be seen in real time.

The embodiments of the present application will be further described in detail below in conjunction with specific examples. The present example is in combination with a method for sampling textures through a vertex shader. For example, a stereo model being a Phoenix model is taken as an example, the effect of tail movement in the Phoenix model is achieved by using the Phoenix model and a Phoenix texture map (the Phoenix texture map is a grayscale image). Specifically, a grayscale image is created with the alignment of the UV distribution of vertexes in the Phoenix model, where a grayscale value in the grayscale image represents the displacement of a corresponding position (i.e., a vertex). In a vertex shader of rendering, using the created grayscale image, grayscale values representing displacement data in the grayscale image are applied to corresponding vertexes of the Phoenix model, thus, the movements of corresponding positions of the Phoenix model are achieved. In this way, the movement effect of a phoenix tail is achieved without increasing the complexity of data processing, i.e., without greatly increasing the amount of data processing compared with an original Phoenix model with no tail movement. Furthermore, this enables an image producer to view the movement effect in real time, thereby facilitating timely modification and improving the efficiency. Here, UV is an abbreviation for texture mapping coordinates U and V, which defines the position information of each vertex in the model.

Figure 2:
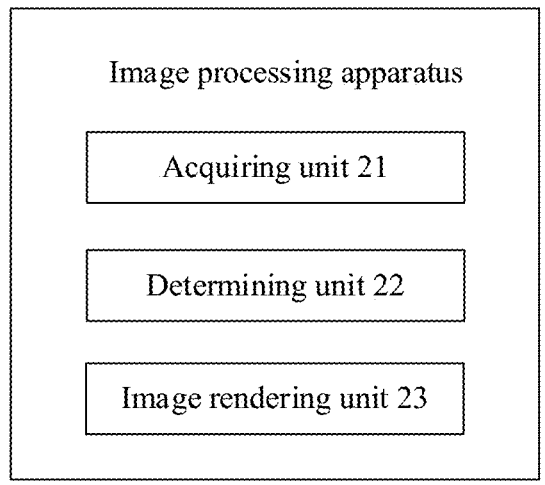
FIG. 2 is a first schematic structural diagram of an image processing apparatus according to an embodiment of the present application.

An embodiment of the present application further provides an image processing apparatus. As shown in FIG. 2, the apparatus includes:
   an acquiring unit 21, configured to acquire first position data of a first vertex in a stereo model;
   a determining unit 22, configured to determine, from a first texture pattern matched with a pattern represented by the stereo model, a second vertex corresponding to the first position data; where the first texture pattern is a grayscale image, and each second vertex in the first texture pattern corresponds to a grayscale value; and
   an image rendering unit 23, configured to take a grayscale value corresponding to the second vertex as a movement offset of the first vertex in the stereo model, to control movement of at least some first vertexes in the stereo model by using movement offsets of the at least some first vertexes.

In a practical application, the stereo model may specifically be a three-dimensional model, the first vertex is any point in the three-dimensional model, and the first vertex and the first position data are in one-to-one correspondence, that is, the first position data can uniquely indicate one vertex.

In a practical application, a vertex shader may be used to take the grayscale value corresponding to the second vertex as the movement offset of the first vertex in the stereo model, and render movement effects of at least some first vertexes in the stereo model.

Figure 3:
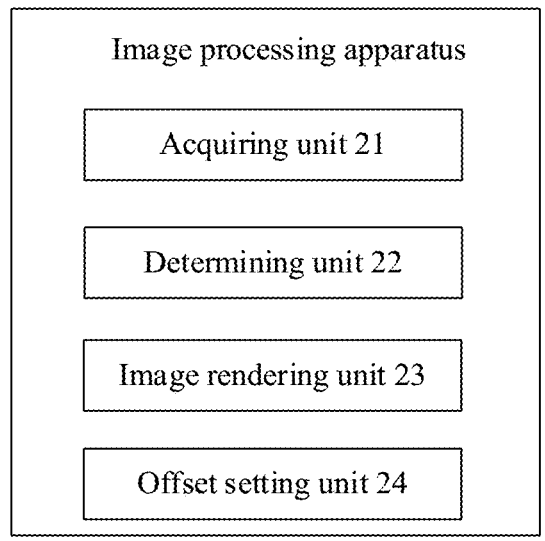
FIG. 3 is a second schematic structural diagram of an image processing apparatus according to an embodiment of the present application.

In a specific example of the present application, the first texture pattern may be generated in the following manner. As shown in FIG. 3, the apparatus further includes: an offset setting unit 24; where,
   the determining unit 22 is further configured to select, from the stereo model, at least some first vertexes to be moved, that is, select, from all the first vertexes of the stereo model, first vertexes to be moved, where the first vertexes which may need to be moved are only a part of or all of the first vertexes; and
   the offset setting unit 24 is configured to set, based on a movement effect, movement offsets of the at least some selected first vertexes, generate a grayscale image matched with the pattern represented by the stereo model (e.g., consistent with the pattern of the stereo model), and at least make grayscale values of second vertexes, which correspond to the at least some first vertexes, in the grayscale image represent movement offsets of the at least some first vertexes, namely, a grayscale value in the grayscale image being used to represent a movement offset; and take the generated gray-scale image as the first texture pattern matched with the pattern represented by the stereo model.

In this way, on the basis of ensuring that the movement effect is achieved, a basis is established for reducing the amount of data processing, and the process is simple and feasible, thereby facilitating subsequent large-scale engineering promotion.

Here, since the grayscale image, that is, the first texture pattern, is adopted to represent the movement offsets of the first vertexes in the stereo model, the movement effect of the first vertexes in the stereo model can be adjusted by adjusting the grayscale values of the second vertexes corresponding to the at least some first vertexes in the first texture pattern. In other words, the movement effect can be adjusted by adjusting grayscale values in the grayscale image. Obviously, compared with the existing method of adjusting the movement effect through adjusting model parameters, it is unnecessary to restart the stereo model in the solution of the present application, which greatly reduces the amount of data processing, and improves the efficiency of data processing at the same time. Furthermore, the adjustment process can be seen in real time, thereby improving the visualization degree.

In another specific example of the present application, the stereo model is a rendered color model. Specifically, before the first position data of the first vertex in the stereo model is acquired, color rendering also needs to be performed on the stereo model. The determining unit 22 is further configured to determine, from a second texture pattern matched with the pattern represented by the stereo model, a third vertex corresponding to the first position data; where the second texture pattern is a color image that matches (i.e., is consistent with) the pattern represented by the stereo model, and each third vertex in the second texture pattern corresponds to a color value, for example, an RGB (red, green, and blue) value. The image rendering unit 23 is further configured to take a color value corresponding to the third vertex as a color value of the first vertex in the stereo model, so as to obtain a color model. Here, the color rendering process described above may be implemented through a vertex shader.

Here, both the first texture pattern and the second texture pattern are patterns consistent with the pattern represented by the stereo model, but colors and functions of the two are different. For example, the first texture pattern is a grayscale image, and a grayscale value of each second vertex in the grayscale image indicates a movement offset of a corresponding vertex in the stereo model; while the second texture pattern is a color image, and a color value of each third vertex in the color image indicates a color value of a corresponding vertex in the stereo model.

In this way, in the solution of the present application, a movement offset of a vertex in the stereo model is represented by a grayscale value of a vertex (i.e., a second vertex) in the first texture pattern matched with the pattern represented by the stereo model. That is to say, the offsets of the vertexes in the stereo model are recorded by the first texture pattern, and thus, it is unnecessary to control the movement of the stereo model through the model parameters, which avoids the problem of low efficiency in movement adjustment caused by controlling the movement of an image by mean of the model parameters, thereby improving the efficiency of image processing.

Furthermore, since a grayscale value of a vertex in a grayscale image is used to record a movement offset, the adjustment of the movement effect becomes simple and convenient, the amount of data processing is small, and an effect of a rendered movement change can be seen in real time.

It should be noted that, the description of the foregoing apparatus embodiments is similar to the description of the foregoing method, and the foregoing apparatus embodiments have the same beneficial effects as those of the foregoing method embodiments, which is not described herein again. For technical details that are not disclosed in the apparatus embodiments of the present application, a person skilled in the art should understand with reference to the description of the method embodiments of the present application, which will not be described herein again for the sake of simplicity.

An embodiment of the present application further provides an image processing device, including: one or more processors; a memory communicatively connected to the one or more processors; and one or more applications, where the one or more applications are stored in the memory and configured to be executed by the one or more processors, and the one or more applications are configured to perform the method described above.

Figure 4:
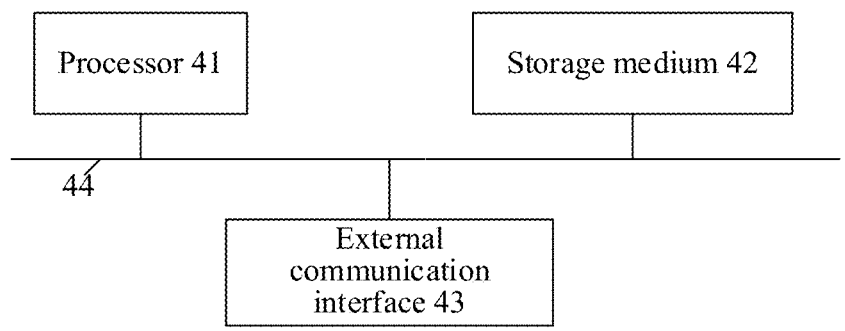
FIG. 4 is a schematic structural diagram of an image processing device according to an embodiment of the present application.

In a specific example, the image processing device according to the embodiment of the present application may specifically be of a structure shown in FIG. 4, and the image processing device at least includes a processor 41, a storage medium 42, and at least one external communication interface 43. The processor 41, the storage medium 42, and the external communication interface 43 are all connected through a bus 44. The processor 41 may be an electronic component having a processing function, such as a microprocessor, a central processing unit, a digital signal processor, or a programmable logic array. The storage medium stores computer executable codes which can execute the method according to any one of the foregoing embodiments. In a practical application, the acquiring unit 21, the determining unit 22, the image rendering unit 23, and the offset setting unit 24 may all be implemented through the processor 41.

It should be noted that, the description of the embodiments of the foregoing image processing device is similar to the description of the foregoing method, and the embodiments of the foregoing image processing device have the same beneficial effects as those of the method embodiments, which will not be described herein again. For technical details that are not disclosed in the embodiments of the image processing device of the present application, a person skilled in the art should understand with reference to the description of the method embodiments of the present application, which will not described herein again for the sake of simplicity.

An embodiment of the present application further provides a computer readable storage medium. The computer readable storage medium stores a computer program. When the program is executed by a processor, the following method is implemented:

acquiring first position data of a first vertex in a stereo model;

determining, from a first texture pattern matched with a pattern represented by the stereo model, a second vertex corresponding to the first position data; where the first texture pattern is a grayscale image, and each second vertex in the first texture pattern corresponds to a grayscale value; and taking a grayscale value corresponding to the second vertex as a movement offset of the first vertex in the stereo model, to control movements of at least some first vertexes in the stereo model by using movement offsets of the at least some first vertexes.

In a specific example of the present application, the following method is further implemented:

selecting from the stereo model, at least some first vertexes to be moved;

setting, based on a movement effect, movement offsets of the at least some selected first vertexes, generating a grayscale image matched with the pattern represented by the stereo model, and at least making grayscale values of second vertexes, which correspond to the at least some first vertexes, in the grayscale image to represent the movement offsets of the at least some first vertexes; and taking the generated grayscale image as the first texture pattern matched with the pattern represented by the stereo model.

In a specific example of the present application, a movement effect is adjusted by adjusting the grayscale values of the second vertexes corresponding to the at least some first vertexes in the first texture pattern.

In a specific example of the present application, the grayscale value corresponding to the second vertex is taken as the movement offset of the first vertex in the stereo model by using a vertex shader to render movement effects of the at least some first vertexes in the stereo model.

In a specific example of the present application, the following method is further implemented: before the acquiring the first position data of the first vertex in the stereo model, determining a third vertex corresponding to the first position data from a second texture pattern matched with the pattern represented by the stereo model; where the second texture pattern is a color image, and each third vertex in the second texture pattern corresponds to a color value; and taking a color value corresponding to the third vertex as a color value of the first vertex in the stereo model to obtain a color model.

Here, the computer readable storage medium may be any apparatus that can contain, store, communicate, propagate, or transport a program for use by or in combination with an instruction execution system, apparatus, or device. More specific examples (a non-exhaustive list) of the computer readable storage medium include the following: an electrical connection portion (an electronic apparatus) having one or more wirings, a portable computer disk cartridge (a magnetic apparatus), a random access memory (Random Access Memory, RAM), a read-only memory (Read Only Memory, ROM), an erasable programmable read-only memory (Erasable Programmable ROM, EPROM, or a flash memory), an optical fiber apparatus, and a portable read-only memory (Compact Disk ROM, CDROM). In addition, the computer readable storage medium may even be paper or other suitable medium on which the program can be printed, as the program may be obtained electronically by, for example, optically scanning the paper or other medium, then editing, interpreting, or otherwise processing in other appropriate manners, and then storing the program in a computer memory.

An embodiments of the present application further provides a computer program product, including computer program instructions. When a processor executes the computer execution instructions, the method according to any one of the above embodiments is implemented.

An embodiment of the present application further provides a computer program. When a processor executes the computer program, the method according to any one of the above embodiments is implemented.

It should be understood that, a person of ordinary skill in the art may understand that all or a part of the steps of the methods according to the embodiments may be implemented by relevant hardware instructed by a program. The program may be stored in a computer readable storage medium. When the program is run, one of or a combination of the steps of the method embodiments is included.

In addition, functional units in the embodiments of the present application may be integrated into one processing module, or each of the units may exist alone physically, or two or more units are integrated into one module. The integrated module may be implemented in a form of hardware, and may also be implemented in a form of a software functional module. If the integrated module is implemented in the form of a software function module and sold or used as an independent product, the integrated module may also be stored in a computer readable storage medium. The storage medium may be a read-only memory, a magnetic disk, or an optical disk.

The embodiments described above are merely a part of rather than all of the embodiments of the present application. All other embodiments obtained by a person skilled in the art based on the embodiments of the present application without creative efforts shall belong to the protection scope of the present application.

What is claimed is:

1. An image processing method, comprising:
   acquiring first position data of a first vertex in a stereo model;
   generating, based on a movement effect, a first texture pattern matched with a pattern represented by the stereo model;
   determining, from the first texture pattern matched with the pattern represented by the stereo model, a second vertex corresponding to the first position data;
   wherein the first texture pattern is a grayscale image, and each second vertex in the first texture pattern corresponds to a grayscale value;
   taking a grayscale value corresponding to the second vertex as a movement offset of the first vertex in the stereo model, to control movements of at least some first vertexes in the stereo model by using movement offsets of the at least some first vertexes; and
   adjusting the movement effect through adjusting grayscale values of second vertexes corresponding to the at least some first vertexes in the first texture pattern.

2. The method according to claim 1, wherein the generating, based on the movement effect, the first texture pattern matched with the pattern represented by the stereo model specifically comprises:
   selecting, from the stereo model, at least some first vertexes to be moved;
   setting, based on the movement effect, movement offsets of the at least some selected first vertexes, generating a grayscale image matched with the pattern represented by the stereo model, and at least making grayscale values of second vertexes, which correspond to the at least some selected first vertexes, in the grayscale image represent the movement offsets of the at least some selected first vertexes; and
   taking the generated grayscale image as the first texture pattern matched with the pattern represented by the stereo model.

3. The method according to claim 2, wherein before the acquiring the first position data of the first vertex in the stereo model, the method further comprises:
   determining a third vertex corresponding to the first position data from a second texture pattern matched with the pattern represented by the stereo model; wherein the second texture pattern is a color image, and each third vertex in the second texture pattern corresponds to a color value; and
   taking a color value corresponding to the third vertex as a color value of the first vertex in the stereo model to obtain a color model.

4. The method according to claim 1, wherein the grayscale value corresponding to the second vertex is taken as the movement offset of the first vertex in the stereo model by using a vertex shader to render movement effects of the at least some first vertexes in the stereo model.

5. The method according to claim 4, wherein before the acquiring the first position data of the first vertex in the stereo model, the method further comprises:
   determining a third vertex corresponding to the first position data from a second texture pattern matched with the pattern represented by the stereo model; wherein the second texture pattern is a color image, and each third vertex in the second texture pattern corresponds to a color value; and
   taking a color value corresponding to the third vertex as a color value of the first vertex in the stereo model to obtain a color model.

6. The method according to claim 1, wherein before the acquiring the first position data of the first vertex in the stereo model, the method further comprises:
   determining a third vertex corresponding to the first position data from a second texture pattern matched with the pattern represented by the stereo model; wherein the second texture pattern is a color image, and each third vertex in the second texture pattern corresponds to a color value; and
   taking a color value corresponding to the third vertex as a color value of the first vertex in the stereo model to obtain a color model.

7. An image processing apparatus, comprising:
   one or more processors;
   a memory communicatively coupled to the one or more processors and storing one or more applications, wherein the one or more applications are configured to be executed by the one or more processors to cause the one or more processors to:
   acquire first position data of a first vertex in a stereo model;
   generate, based on a movement effect, a first texture pattern matched with a pattern represented by the stereo model;
   determine, from the first texture pattern matched with the pattern represented by the stereo model, a second vertex corresponding to the first position data;
   wherein the first texture pattern is a grayscale image, and each second vertex in the first texture pattern corresponds to a grayscale value;
   take a grayscale value corresponding to the second vertex as a movement offset of the first vertex in the stereo model, to control movements of at least some first vertexes in the stereo model by using movement offsets of the at least some first vertexes; and
   adjust the movement effect through adjusting grayscale values of second vertexes corresponding to the at least some first vertexes in the first texture pattern.

8. The apparatus according to claim 7, wherein the one or more applications are further configured to cause the one or more processors to:
   select, from the stereo model, at least some first vertexes to be moved; and
   set, based on the movement effect, movement offsets of the at least some selected first vertexes, generate a grayscale image matched with the pattern represented by the stereo model, and at least make grayscale values of second vertexes, which correspond to the at least some selected first vertexes, in the grayscale image represent movement offsets of the at least some selected first vertexes; and take the generated grayscale image as the first texture pattern matched with the pattern represented by the stereo model.

9. The apparatus according to claim 8, wherein the one or more applications are further configured to cause the one or more processors to determine, from a second texture pattern matched with the pattern represented by the stereo model, a third vertex corresponding to the first position data; wherein the second texture pattern is a color image, and each third vertex in the second texture pattern corresponds to a color value; and
   take a color value corresponding to the third vertex as a color value of the first vertex in the stereo model, to obtain a color model.

10. The apparatus according to claim 7, wherein the one or more applications are further configured to cause the one or more processors to determine, from a second texture pattern matched with the pattern represented by the stereo model, a third vertex corresponding to the first position data; wherein the second texture pattern is a color image, and each third vertex in the second texture pattern corresponds to a color value; and
    take a color value corresponding to the third vertex as a color value of the first vertex in the stereo model, to obtain a color model.

11. A non-transitory computer readable storage medium, having a computer program stored thereon, wherein when the program is executed by a processor, the program is configured to cause the processor to:
    acquire first position data of a first vertex in a stereo model;
    generate, based on a movement effect, a first texture pattern matched with a pattern represented by the stereo model;
    determine, from the first texture pattern matched with the pattern represented by the stereo model, a second vertex corresponding to the first position data;
    wherein the first texture pattern is a grayscale image, and each second vertex in the first texture pattern corresponds to a grayscale value;
    take a grayscale value corresponding to the second vertex as a movement offset of the first vertex in the stereo model, to control movements of at least some first vertexes in the stereo model by using movement offsets of the at least some first vertexes; and
    adjust the movement effect through adjusting grayscale values of second vertexes corresponding to the at least some first vertexes in the first texture pattern.

12. The non-transitory computer readable storage medium according to claim 11, wherein the program is further configured to cause the processor to:
    select, from the stereo model, at least some first vertexes to be moved;
    set, based on the movement effect, movement offsets of the at least some selected first vertexes, generate a grayscale image matched with the pattern represented by the stereo model, and at least make grayscale values of second vertexes, which correspond to the at least some selected first vertexes, in the grayscale image represent the movement offsets of the at least some selected first vertexes; and
    take the generated grayscale image as the first texture pattern matched with the pattern represented by the stereo model.

13. The non-transitory computer readable storage medium according to claim 12, wherein the program is further configured to cause the processor to:
    determine a third vertex corresponding to the first position data from a second texture pattern matched with the pattern represented by the stereo model; wherein the second texture pattern is a color image, and each third vertex in the second texture pattern corresponds to a color value; and take a color value corresponding to the third vertex as a color value of the first vertex in the stereo model to obtain a color model.

14. The non-transitory computer readable storage medium according to claim 11, wherein the program is further configured to cause the processor to:

determine a third vertex corresponding to the first position data from a second texture pattern matched with the pattern represented by the stereo model; wherein the second texture pattern is a color image, and each third vertex in the second texture pattern corresponds to a color value; and take a color value corresponding to the third vertex as a color value of the first vertex in the stereo model to obtain a color model.

* * * * *